Patented May 30, 1944

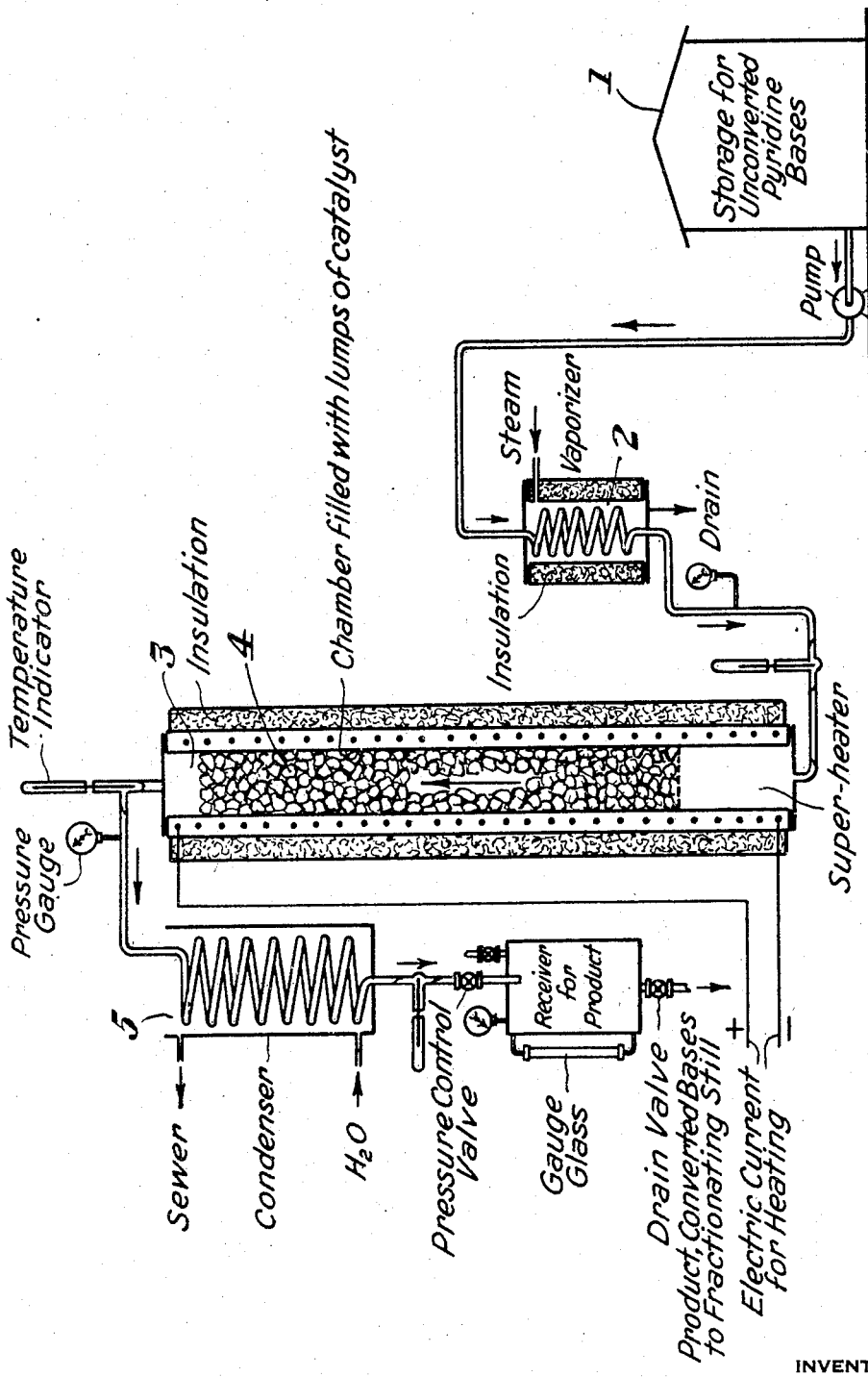

2,349,896

UNITED STATES PATENT OFFICE 2,349,896

PROCESS FOR PREPARING METHYL PYRIDINES SUITABLE FOR CONVERSION INTO NICOTINE DERIVATIVES

Philip J. Wilson, Jr., and Joseph H. Wells, Pittsburgh, Pa., assignors to Carnegie-Illinois Steel Corporation, a corporation of New Jersey Application January 30, 1942, Serial No. 428,960

7 Claims. (Cl. 260—290)

Nicotine derivatives, such as nicotinic acids, have become important pharmaceutical products, nicotine compounds finding extensive use as specific drugs in the treatment of pellagra.

For the preparation of these compounds 3-methyl pyridine (beta-picoline) is an important starting material; and, in accordance with the present invention, there are provided certain improvements in the production of 3-methyl pyridine (beta-picoline) which is, as has been mentioned above, a desirable material for the production of nicotine compounds, it being converted by oxidation into nicotinic acid.

In the treatment of coal tar, the tar is distilled and the tar distillate is extracted with sulphuric acid to remove tar bases, which include pyridine and methyl pyridines. The sulphuric acid extract is rendered alkaline with caustic soda or ammonium hydroxide and the bases which are released are separated from the aqueous solution and subjected to fractional distillation, the fractions boiling between 128° C. and 172° C. containing the methyl pyridines that are subjected to the treatment of the present invention.

These methyl pyridines include 2-methyl pyridine, 3-methyl pyridine, 4-methyl pyridine, 2,6-di-methyl pyridine, 2,4-di-methyl pyridine, and 2,4,6-tri-methyl pyridine.

As has been said before herein, 3-methyl pyridine (beta-picoline) is a convenient starting material for the production of nicotinic acid. However, prior to the present invention, it has not been realized that it is possible to increase the yield of 3-methyl pyridine present in the said fraction by conversion of 2- or 4-methyl pyridine into 3-methyl pyridine. In fact, such conversion was not known prior to the present invention.

In accordance with the present invention, therefore, there are provided certain improvements in the production of 3-methyl pyridine, which improvements are based upon the discovery that the 2- or 4-methyl pyridines, respectively, or their mixtures, may be converted readily into 3-methyl pyridine by heating at elevated temperatures and in the absence of free oxygen.

In carrying out the process of the present invention 2- or 4-methyl pyridine is heated to at least 500° C., either in the liquid phase under suitable pressures, or in the vapor phase. This heating is found to convert substantial amounts of the 2- or 4-methyl pyridine into 3-methyl pyridine, the reaction being facilitated by suitable catalysts, such as chromic oxide, for example. It is found in practice that the reaction proceeds at moderate pressures, even as low as atmospheric pressure for operating in the liquid phase; however, pressures elevated up to about 500 lbs. per sq. in. in conjunction with the heating may expedite the reaction.

The invention will be understood more readily by referring to the accompanying drawing, which shows a schematic flow sheet of the process.

Referring more particularly to the drawing, in accordance with the process of the present invention, pyridine bases are conveyed by suitable means, such as a pump, from storage tank 1 to a vaporizer 2, where superheated steam or any other convenient source of heat is provided to vaporize the mixture of pyridine bases.

The vapor (or hot liquid if the pressure in the system is sufficient to prevent vaporization) passes into a reaction chamber 3, which contains lumps 4 of catalytic material. The catalyst employed, which, as has been mentioned above, suitably is chromic oxide, conveniently may be coated on the surface of a carrier, such as lumps of coke, for instance, or the catalytic material may be prepared itself in lump form. The reaction proceeds preferably at temperatures of at least 500° C.

From the reaction chamber 3, after sufficient time has elapsed to effect the conversion of about 50% of the mixture of pyridine bases into 3-methyl pyridine, the vapors are swept out of the reaction chamber 3 through suitable pressure manipulations, and into a condenser 5, where they are cooled sufficiently to liquefy. The apparatus shown is a closed system which prevents admission of air to the reaction environment.

The condensate is a mixture of the original methyl pyridines, plus the beta-picoline which has been formed. It must now be separated into its several components. If the starting material was alpha-picoline, the raw material and the product may be separated by fractional distillation, but if it consisted of bases boiling at 143°-145° C., it will consist essentially of beta-picoline, gamma-picoline, and 2,6-dimethyl pyridine. In view of the fact that distillation cannot be used for this separation, since the boiling points of all three compounds are 144° C., plus or minus 1° C., various chemical means may be employed to accomplish the separation. For example, the mixture of the condensed pyridine bases may be boiled with benzaldehyde in the presence of acetic anhydride for two days at atmospheric pressure. The commercially important beta-picoline may be removed from the solid products formed by the reaction of gamma-picoline with benzaldehyde, and 2,6-di-methyl pyridine with benzaldehyde by steam distillation, or it may be recovered by an alternative process, hereinafter set forth. When separated by steam distillation it will be contaminated with some unreacted gamma-picoline.

The beta-picoline steam distillate is condensed, dehydrated, and redistilled in the conventional manner, and then is in a form which may be converted to nicotinic acid, or its derivatives. This conversion may be carried out by oxidation reactions.

The basis for designating the locations of groups attached to a pyridine nucleus are shown by the following formulae:

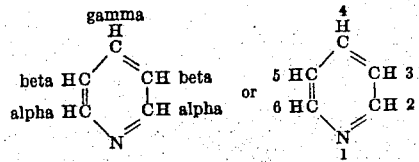

These terminologies may be used interchangeably. Thus, alpha-picoline is the same as 2-methyl pyridine, and alpha-, gamma-lutidine is the same as 2,4-di-methyl pyridine.

In accordance with the present invention it is found that 2-methyl pyridine is converted into beta-picoline in accordance with the following reaction:

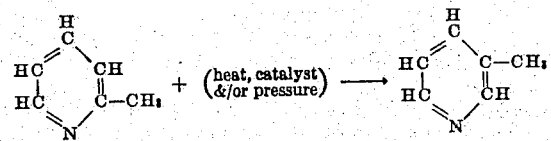

Similarly, 4-methyl pyridine is converted into beta-picoline in accordance with the following reaction:

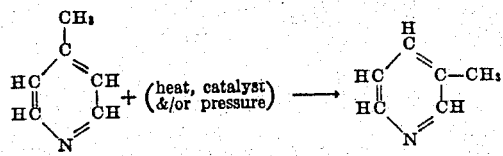

The process of the present invention also may be used to produce methyl pyridines having a methyl group in the 3- or 5-position from polymethylated pyridines with the groups in the 2- or 4-position; or a polymethylated pyridine with the methyl groups in the 2- and 6-position may be converted into 3,6-di-methyl pyridine, as indicated by the reaction:

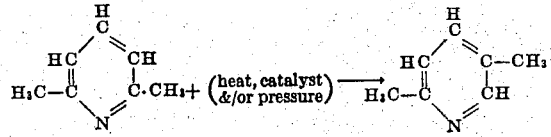

When the treatment yields as the principal reaction product a mixture of beta-picoline, 2,6-di-methyl pyridine, and gamma-picoline, all of which boil at approximately 144° to 145° C., the 2,6-di-methyl pyridine is separated from the beta-picoline and some of the gamma-picoline by reaction with benzaldehyde in the presence of acetic anhydride as catalyst:

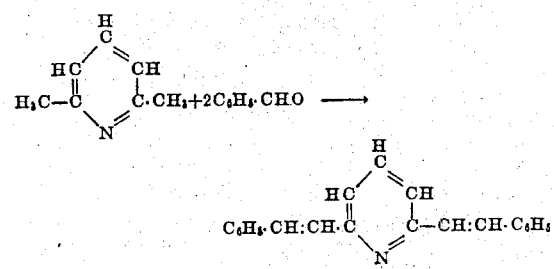

The unreacted picolines are distilled from the reaction product, dried, and the beta-picoline then is separated from any unreacted gamma-picoline by the addition of zinc chloride solution:

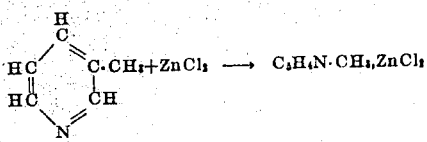

The resulting double salt of beta-picoline-zinc chloride is precipitated, recrystallized, and dried. The beta-picoline may be recovered by treating the salt with sodium hydroxide.

The recovered beta-picoline may be converted by oxidation into nicotinic acid, by a suitable oxidizing agent, such as potassium permanganate or electrolytic oxidation:

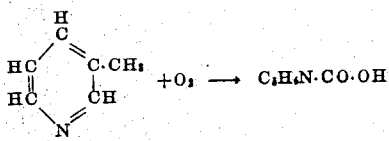

The process affords a ready procedure for producing from materials heretofore unavailable for the purpose, a convenient product adapted to be converted readily into nicotinic acid and its derivatives. The unreacted methyl pyridines pass through the system unchanged and may be recycled for reareatment, or the unreacted methyl pyridines may be recovered as such, if desired.

We claim:

1. The process of producing 3-methyl pyridine suitable for conversion into nicotine derivatives, which comprises heating, in the presence of a catalyst, a methyl pyridine selected from the class consisting of 2-methyl pyridine and 4-methyl pyridine to a temperature of at least approximately 500° C. and in the absence of free oxygen until substantial rearrangement of the compound of the said class is effected, and recovering the 3-methyl pyridine from the resulting reaction made.

2. The process of producing methyl pyridines from poly-methyl pyridines, which comprises heating the poly-methyl pyridines to a temperature sufficiently elevated in the presence of a catalyst to effect a rearrangement of the methyl groups and in the absence of free oxygen, and maintaining the said temperature until a substantial rearrangement to 3-methyl pyridine is effected.

3. The process of obtaining 3-methyl pyridine from materials containing at least one of the class of compounds consisting of 2- and 4-methyl pyridine, which comprises heating, in the presence of a catalyst and in the absence of free oxygen, the said material to temperatures sufficient to produce a substantial rearrangement of the said group material into a reaction product consisting essentially of beta-picoline, gamma-picoline, and 2,6-di-methyl pyridine, reacting upon the said reaction product with benzaldehyde, distilling beta- and gamma-picolines from the resulting reaction product, and separating the beta-picoline from the gamma-picoline.

4. The process of obtaining 3-methyl pyridine from materials containing at least one of the class of compounds consisting of 2- and 4-methyl pyridine, which comprises heating the said material to temperatures sufficient to produce a substantial rearrangement of the said group material into a reaction product consisting essentially of beta-picoline, gamma-picoline, and 2,6-di-methyl pyridine, the heating being carried out in the presence of a catalyst and in the absence of free oxygen, reacting upon the said reaction product with benzaldehyde, distilling beta- and gamma-picolines from the resulting reaction product, separating the beta-picoline from the gamma-picoline by adding zinc chloride solution, precipitating the resulting double salt of beta-picoline and zinc chloride and recovering the beta-picoline from the said double salt by treating the said salt with sodium hydroxide.

5. The process of obtaining 3-methyl pyridine from materials containing at least one of the group of compounds consisting of 2- and 4-methyl pyridine, which comprises heating the said material to temperatures sufficient to produce a substantial rearrangement of the said group material into a reaction product consisting essentially of beta-picoline, gamma-picoline, and 2,6-dimethyl pyridine, the heating being carried out in the presence of a catalyst and in the absence of free oxygen, reacting upon the said reaction product with benzaldehyde, distilling beta- and gamma-picolines from the resulting reaction product, separating the beta-picoline from the gamma-picoline by adding zinc chloride solution, precipitating the resulting double salt of beta-picoline and zinc chloride, recovering the beta-picoline from the said double salt by treating the said salt with sodium hydroxide, and oxidizing the resulting recovered beta-picoline to nicotinic acid.

6. The method of producing 3-methyl pyridine from materials containing a polymethyl pyridine selected from the class of compounds consisting of 2- and 4-methyl pyridine, which comprises heating the said material in the absence of free oxygen sufficiently to convert the polymethyl pyridine contained therein into a reaction product containing 3-methyl pyridine, maintaining the heating in the presence of chromic oxide catalyst, and recovering the 3-methyl pyridine from the said reaction product.

7. The process of obtaining 3-methyl pyridine from materials containing at least one of the group of compounds consisting of 2- and 4-methyl pyridine, which comprises heating the said material, in the presence of a catalyst and in the absence of free oxygen, to temperatures sufficient to produce a substantial rearrangement of the said compound into a reaction product consisting essentially of beta-picoline, gamma-picoline, and 2,6-di-methyl pyridine, and separating the beta-picoline from the said reaction product.

PHILIP J. WILSON, Jr.
JOSEPH H. WELLS.